Dec. 14, 1943. A. DE BENEDICTIS ET AL 2,336,720
PROCESS FOR SEPARATING 2,3,6-TRIMETHYL PHENOL
Filed Dec. 1, 1941
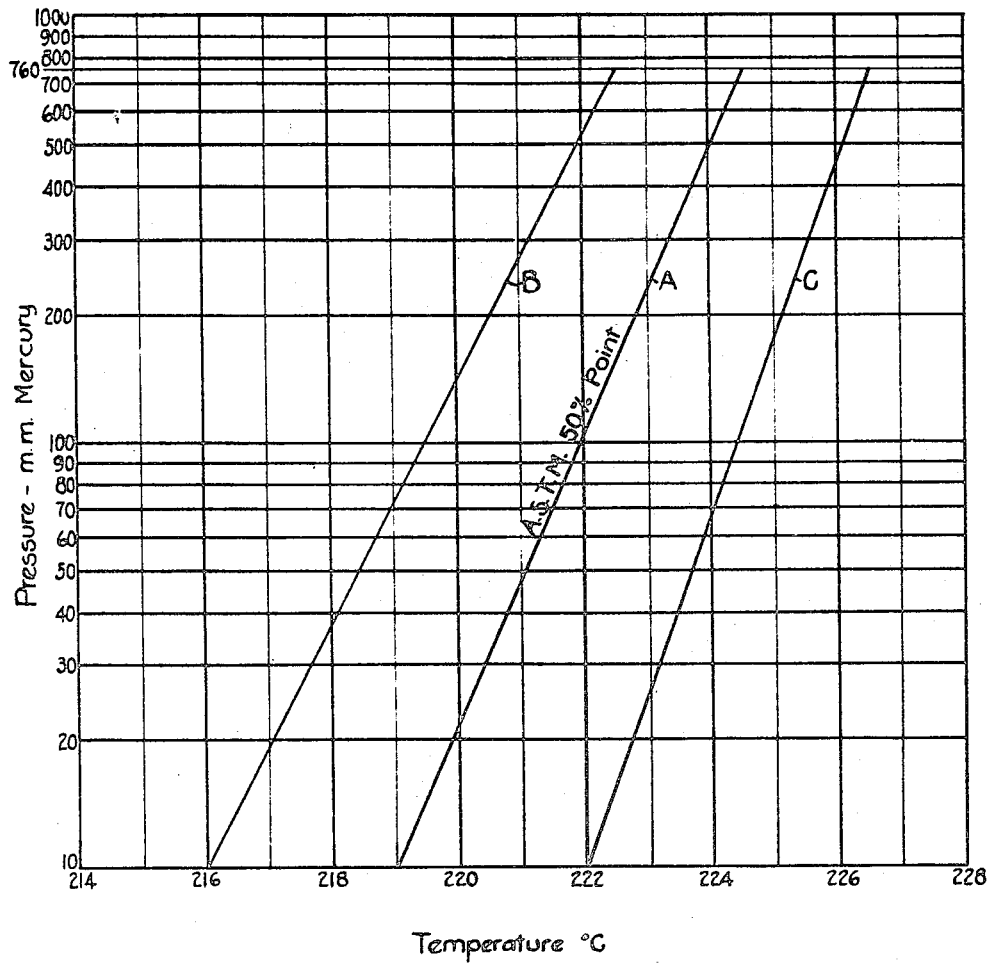
Inventors: Aldo De Benedictis
Daniel B. Luten Jr.
By their Attorney Patented Dec. 14, 1943

2,336,720

UNITED STATES PATENT OFFICE 2,336,720

PROCESS FOR SEPARATING 2,3,6-TRIMETHYL PHENOL

Aldo De Benedictis and Daniel B. Luten, Jr., Berkeley, Calif., assignors to Shell Development Company, San Francisco, Calif., a corporation of Delaware Application December 1, 1941, Serial No. 421,120

9 Claims. (Cl. 260—621)

The present invention relates to a process for recovering 2,3,6-trimethyl phenol from petroleum and coal tar sources. More particularly, it relates to a process for recovering this phenol from phenolic fractions derived from petroleum or coal tar which are usually recovered therefrom by extraction with a caustic alkali solution followed by subsequent "springing" with a stronger acid, usually a gas, for example carbon dioxide, to liberate the phenols, which are recovered by phase separation, extraction with organic solvents, distillation, etc.

In the past it has been supposed that substituted phenols of the di-ortho type remained in hydrocarbon fractions which were extracted with caustic alkali because these phenols are known to have very greatly reduced acidities which were expected to prevent their forming compounds with caustic alkali. We have discovered that this apparently is not true; that, for some reason, perhaps due to a solutizing effect of other dissolved phenols, 2,3,6-trimethyl phenol is in fact extracted from the hydrocarbons normally associated therewith with various caustic alkali solutions along with other phenols. Further, we have discovered it is possible to prepare this compound in a pure state from such mixtures.

2,3,6-trimethyl phenol is a useful intermediate in organic synthesis. It is particularly useful as an intermediate employed in the synthesis of vitamin E.

The boiling temperature of 2,3,6-trimethyl phenol is reported in the literature to be 219° C., and apparently this explains one reason why it has heretofore never been reported as a constituent of coal tar phenols. We have discovered that, unexpectedly, 2,3,6-trimethyl phenol occurs in fractions boiling from about 220 to 230° C.

Our invention comprises preparing from a hydrocarbon or coal tar phenolic mixture a fraction having an A. S. T. M. 5-95% boiling range of about 220-230° C. respectively or narrower, sulfonating this mixture under conditions to form phenol monosulfonic acids, then treating the resulting sulfonated mixture with an aqueous solution of a water-soluble salt of ammonia or a metal selected from the group including alkali metals and alkaline earth metals. Under these circumstances the 2,3,6-trimethyl phenol sulfonic acid forms a relatively insoluble salt which readily separates from the residual soluble material. If desired, the unsulfonated residue may be separated from the sulfonation product prior to treatment with the water-soluble salt. The 2,3,6-trimethyl phenol is readily regenerated from the corresponding salt by hydrolysis and conveniently separated from the hydrolysis mixture by extraction with a water-immiscible organic solvent for phenols.

The figure is a graph upon which temperature in degrees centigrade is plotted as abscissa on a logarithmic scale versus pressure in millimeters of mercury as ordinate plotted on a linear scale. The ordinate represents various pressures at which a fraction may be distilled and the abscissa related thereto by line A represents the A. S. T. M. 50% point of fractions from which 2,3,6-trimethyl phenol can be isolated according to our process provided the range between the A. S. T. M. 5% and 95% points is not greater than about 10° C. The distance between lines B and C represents permissible variations in the 50% A. S. T. M. point for a fraction prepared at any given pressure for recovery of 2,3,6-trimethyl phenol. It will be noted that the A. S. T. M. 50% point of a fraction distilled at 10 mm. may vary from 216° C. to 222° C., but if a fraction is distilled at 760 mm. the permissible variation is only from 222.5° C. to 226.5° C.

The step of preparing the fraction from the mixture of phenols of wider boiling range is conveniently carried out by fractional distillation under ordinary atmospheric pressure, although if desired vacuum fractionation may be employed. The breadth of the fraction treated by the process may have A. S. T. M. 5-95% points as wide as from 220° C. to 230° C. (although it is preferred to treat a narrower boiling fraction, e. g. one having A. S. T. M. 5-95% points of about 6° C. or less). If wider boiling fractions are treated, difficulty is usually encountered owing to the presence of other phenols than 2,3,6-trimethyl phenol, which sometimes tend to separate with the 2,3,6-trimethyl phenol and thus make the preparation of a purified product exceedingly difficult. It is necessary that the fraction treated have an A. S. T. M. 50% point which falls between lines B and C of the graph of the figure at the points corresponding to the pressure at which it is distilled.

The sulfonation step is conveniently carried out with sulfuric acid or other sulfonating acid, such as chlorosulfonic acid. When employing sulfuric acid amounts from one to two molecular equivalents of sulfuric acid per molecular equivalent of phenol at room temperature gives satisfactory sulfonation, although in certain cases larger ratios of sulfonating acid to phenols may be used. However, sometimes it may be preferable to use less acid, for example when the fraction to be treated is known to contain appreciable quantities of phenols which are known to sulfonate with considerable difficulty, such as 2,4,6-trimethyl phenol or 2,3,5-trimethyl phenol. In other words, under these circumstances less acid serves to monosulfonate the 2,3,6-trimethyl phenol and the unsulfonated residue can be easily removed prior to treatment with the water-soluble salt. In this manner the saving of reagents may be effected. The sulfonation step may be carried out at any temperature between about 0 and 130° C. However, we have found that atmospheric temperature is ordinarily convenient. Temperatures above 130° C. tend to give polysulfonation and decomposition, and therefore are best avoided.

The sulfonation product including 2,3,6-trimethyl phenol sulfonic acid may be separated from unsulfonated residue by extraction with a water-immiscible organic solvent or by other means if desired, although this step is not necessary for the production of 2,3,6-trimethyl phenol. For example, if desired the sulfonation product may be treated with a hydrocarbon solvent such as petroleum ether, gasoline, naphtha, pentane, hexane, benzene, toluene, etc., to separate it into a hydrocarbon-soluble unsulfonated residue and a water-soluble sulfonated mixture which latter may be further treated according to our process. The treatment with the water-soluble salt is preferably carried out with aqueous salt solutions which are at least 50% saturated, and preferably 60-90% saturated. We prefer not to use solutions which are substantially completely saturated, because such solutions tend to deposit salt crystals in the presence of sulfonic acid salts, although this is not a serious objection since deposited salt crystals can be easily separated in the subsequent hydrolysis step. Although we have found that separation can be carried out in neutral or even alkaline solutions, it is preferable to carry out the separation in an acid solution. Under these conditions we have found more complete separation to be possible.

The precipitated 2,3,6-trimethyl phenol sulfonic acid salt is hydrolyzed by heating in strongly acid solutions, for example 50% sulfuric acid solution has been found to offer a convenient hydrolytic medium, although sulfuric acid solutions containing 30-70% sulfuric acid, at temperatures between about 80 and 130° C., may be used.

Examples of suitable salts for our process are water-soluble salts of ammonia and metals of the alkali metal and alkaline earth group, including for example sodium chloride, sodium sulfate, potassium chloride, calcium chloride, barium nitrate, barium chloride, etc. Although any water-soluble salt as described above may be employed, we prefer to employ the acid sulfates of ammonium, sodium or potassium, and in particular potassium acid sulfate, because their application permits a regenerative process to be employed.

Our process can better be understood from the following example:

1,000 grams of a fraction of petroleum alkyl phenols having A. S. T. M. distillation characteristics as follows: 5% distills at 222°.; 50% distills at 223°.; and 95% distills at 224° C.; and which contained relatively small amounts of 2,3,6-trimethyl phenol, was sulfonated at room temperature with 1,000 grams of concentrated sulfuric acid. The product was diluted with 2 liters of water and extracted with benzene to remove the unsulfonated phenol fraction, which consisted mainly of mesitol (2,4,6-trimethyl phenol); a residual aqueous phase was mixed with 7,234 grams of a 38% aqueous potassium acid sulfate solution. Upon cooling to 0° C. a flocculent precipitate of potassium phenol sulfonates appeared, which when filtered and dried weighed 640 grams. This precipitate was hydrolyzed to regenerate the phenols contained in it by dissolving in 50% sulfuric acid and heating it for 24 hours at 100° C. The regenerated phenols were extracted from the aqueous acid solution and distilled. The distillate weighed 240 grams. This product, while not pure 2,3,6-trimethyl phenol, contained it in such a concentrated form that it precipitated out of the solution well above room temperature and then, by filtration at 0° C., 45 grams of substantially pure 2,3,6-trimethyl phenol were separated from the mother liquor, a yield of 4.5% of the original charge. A portion of this product was further purified by recrystallization from octane to give crystals which had a melting point of 62.6–63.1° C. The identity of the 2,3,6-trimethyl phenol was confirmed by a mixed melting point determination with a synthetic sample of 2,3,6-trimethyl phenol.

We claim as our invention:

1. A process for separating 2,3,6-trimethyl phenol from a mixture of phenols ordinarily associated therewith in petroleum and coal tar alkyl phenols, comprising distilling said mixture to produce a fraction having a 5%–95% A. S. T. M. boiling range of not more than 10° C. and containing at least a substantial portion of said 2,3,6-trimethyl phenol, sulfonating said fraction under conditions to produce monosulfonic acids without forming substantial amounts of polysulfonic acids, treating the sulfonated mixture with an aqueous solution of a salt selected from the group of salts of ammonium, alkali metals and alkaline earth metals, of sufficient concentration to form a precipitate, and separating said precipitate from residual mixture.

2. The process of claim 1 wherein said fraction has a range between its A. S. T. M. 5% and 95% points not greater than about 6° C.

3. The process of claim 1 wherein said sulfonated mixture is treated with an acid sulfate of ammonium, sodium or potassium.

4. The process of claim 1 wherein said mixture is treated with an aqueous solution of potassium acid sulfate.

5. The process of claim 1 wherein said precipitate is formed in an acid solution.

6. The process of claim 1 wherein unsulfonated materials are removed from said sulfonated fraction prior to treatment with an aqueous salt solution.

7. The process of claim 1 wherein said unsulfonated materials are removed from said sulfonated fraction with a substantially water-immiscible solvent prior to treatment with aqueous salt solution.

8. A process for separating 2,3,6-trimethyl phenol from a mixture of phenols ordinarily associated therewith in petroleum and coal tar alkyl phenols, comprising distilling said mixture to produce a fraction having a 5%–95% A. S. T. M. boiling range of not more than 10° C. and containing at least a substantial portion of said 2,3,6-trimethyl phenol, sulfonating said fraction under conditions to produce monosulfonic acids without forming substantial amounts of polysulfonic acids, treating the sulfonated mixture with an aqueous solution of a salt selected from the group of salts of ammonium, alkali metals and alkaline earth metals, of sufficient concentration to form a precipitate, separating said precipitate from residual mixture and hydrolyzing said precipitate to regenerate 2,3,6-trimethyl phenol.

9. The process of claim 8 wherein said hydrolysis is carried out in sulfuric acid solution containing from 30% to 70% sulfuric acid, at elevated temperature.

ALDO DE BENEDICTIS.
DANIEL B. LUTEN, Jr.